United States Patent [19]
Barthel et al.

[11] Patent Number: 5,590,278
[45] Date of Patent: Dec. 31, 1996

[54] METHOD FOR DETECTING ADDRESSING ERRORS IN AN ELECTRICAL UNIT

[75] Inventors: Herbert Barthel, Herzogenaurach; Horst Daar, Erlangen; Hartmut Schuetz, Heroldsbach, all of Germany

[73] Assignee: Siemens Aktiengesellschaft, Munich, Germany

[21] Appl. No.: 240,345

[22] Filed: May 10, 1994

[30] Foreign Application Priority Data

May 11, 1993 [DE] Germany .............................. 4315713.0

[51] Int. Cl.⁶ .................................................. G06F 13/10
[52] U.S. Cl. ................................................. 395/185.06
[58] Field of Search .......................... 395/575, 185.06, 395/183.14, 182.02, 200.01, 200.16, 824, 828, 829, 846; 371/67.1, 68.1; 364/200, 900

[56] References Cited

U.S. PATENT DOCUMENTS

| | | | |
|---|---|---|---|
| 3,796,994 | 3/1974 | Nuss, Jr. | 340/163 |
| 4,041,460 | 8/1977 | Wisdom et al. | 364/900 |
| 4,165,533 | 8/1979 | Jonsson | 364/900 |
| 4,340,933 | 7/1982 | Miu et al. | 364/200 |
| 4,342,084 | 7/1982 | Sager et al. | 364/200 |
| 4,485,437 | 11/1984 | Kinghorn | 364/200 |
| 4,903,194 | 2/1990 | Houdek et al. | 364/200 |

FOREIGN PATENT DOCUMENTS

| | | |
|---|---|---|
| 199933 | 11/1986 | European Pat. Off. . |
| 421471 | 10/1990 | European Pat. Off. . |
| 2423260 | 11/1975 | Germany . |
| 3544207 | 10/1988 | Germany . |
| 3640670 | 7/1992 | Germany . |

OTHER PUBLICATIONS

IBM Technical Disclosure Bulletin, vol. 24, No. 8, Jan. 1982, F. L. Robinson and D. E. Torrens: *Verifying Peripheral Device Addressess, p. 4053.*

*Primary Examiner*—Robert W. Beausoliel, Jr.
*Assistant Examiner*—Stephen C. Elmore
*Attorney, Agent, or Firm*—Kenyon & Kenyon

[57] ABSTRACT

A method for detecting addressing errors in an electrical unit. The electrical unit may, e.g., include a central processing unit and modules that respond to the central processing unit via a communication system by means of addresses specific to the modules. Addressing errors caused by faulty modules can be detected. For at least a portion of the accesses made by the central processing unit on one of the modules, an identifier is transmitted from the addressed module to the central processing unit. The identifier transmitted to the central processing unit is compared to a reference identifier. Addressing errors are recognized when the transmitted identifier deviates from the reference identifier.

6 Claims, 3 Drawing Sheets

METHOD FOR DETECTING ADDRESSING ERRORS IN AN ELECTRICAL UNIT

FIELD OF THE INVENTION

The present invention relates to a method for detecting addressing errors in an electrical unit. The electrical unit includes a central processing unit and associated modules. The modules are capable of functioning in response to the central processing unit via a communication system using addresses specific to the modules. These types of methods for detecting addressing errors may be employed, e.g., within automation systems for programmable controllers.

BACKGROUND OF THE INVENTION

In previous methods of detecting addressing errors, an error occurring in these electrical units was only detected when an addressed module did not respond within a specified time. This performance defect is usually described as an acknowledgement delay. Another defect may be that a module signals as if it had been addressed even though the central processor had not addressed that module. Currently, however, no methods are known for detecting whether a defective module responds to an addressing because of this type of hardware error rather than a true addressing. It is inconsequential in such a case whether the defective module responds in place of the addressed module or in addition to that module. In both cases, the consequences are that significant faulty responses are recorded by the electrical unit.

Therefore, there is a need for a method which will enable a faulty response on the part of a defective module to be quickly identified.

SUMMARY OF THE INVENTION

The need is met by the present invention. For at least a portion of the accesses made by a central processing unit to one of several modules, an identifier is transmitted from the addressed module to the central processing unit. The identifier thus transmitted to the central processing unit is compared to a reference identifier. Addressing errors are recognized when the transmitted identifier deviates from the reference identifier.

To determine if an erroneous module responds in addition to a correct module, the following procedure may be utilized. First, each module has a storage element with a write and read capability. A first identifier is initially stored in the storage elements of the modules. This identifier may be the same for all modules. The contents of each storage element are then read out in a specific sequence. A reference identifier is compared to the previously stored first identifier, and a second identifier that differs from the first identifier is written into the storage element. This identifier may also be the same for all modules. Again, addressing errors are recognized as soon as one of the reference identifiers deviates from the previously stored first identifier.

The specific sequence in which the storage elements, also denoted registers, are read out may be, e.g., ascending or descending according to the address of the modules. In fact, an ascending sequence may be immediately followed by a descending one. In this case, during the descending sequence, the second identifiers would be replaced by third identifiers differing from the second identifiers. This third identifier may, however, be the same as the first identifier. In this way, modules that respond erroneously may be detected in two ways: first if they respond to addresses below their actual address, and second if they respond to addresses above their actual address. This feature is also present in another embodiment of the present invention, in which a descending sequence is immediately followed by an ascending sequence.

A response by only a defective module also can be recognized. For example, when reading accesses are made by the central processing unit to one of the modules, a module-specific identifier may be transmitted along with the data from the module in order to allow the central processing unit to become aware of which module is responding. Addressing errors may then be recognized when the transmitted module-specific identifier deviates from a module-specific reference identifier. The module-specific identifier may correspond to an address of the module. The module-specific reference identifier may correspond to a hardware slot in which the module is located.

The method for detecting addressing errors of the present invention is advantageously applied to automation systems, particularly to redundant automation systems. Error detection in these systems is particularly important because when a malfunction is experienced by automation systems, there may be the immediate danger of material damage or even personal injury.

DETAILED DESCRIPTION

Figure 1:
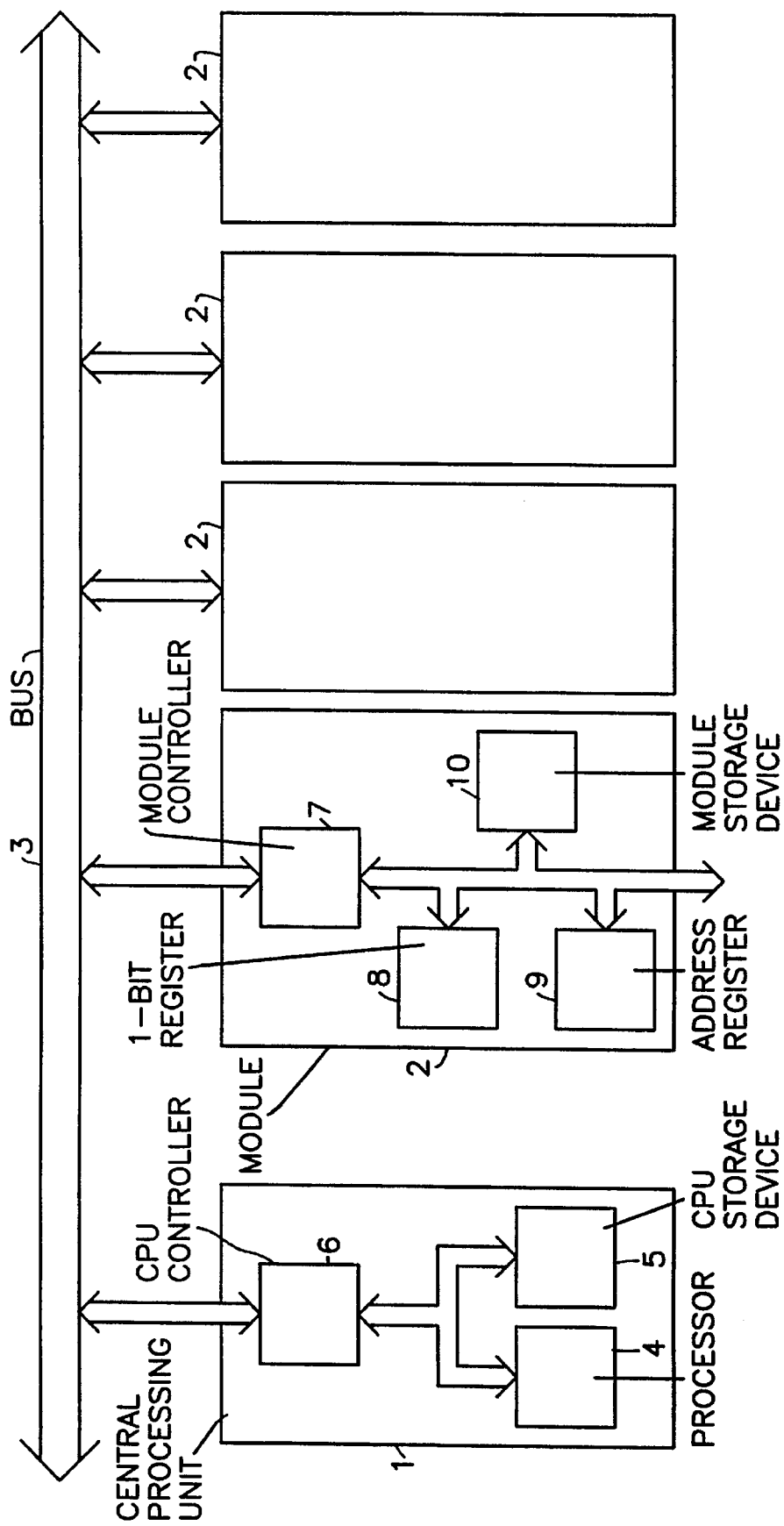
FIG. 1 shows a block diagram of an embodiment of the present invention.

In accordance with FIG. 1, an electrical unit is designed as a modular automation system. It is comprised of a central processing unit 1 and of several modules 2. These modules 2 make up the secondary units of the electrical unit. The central processing unit 1 and the modules 2 can communicate with one another via a bus 3.

The central processing unit 1 has a processor 4 and a cpu storage device 5. Stored, inter alia, in the storage device 5 is a program which may be executed by the processor 4. When executing the program, the processor 4 accesses the modules 2 via a cpu controller 6 and the bus 3. The modules 2 are addressed using module-specific addresses. An address may be defined, e.g., by the slot where a module is inserted into the automation system.

To allow communication, each of the modules 2 has a module controller 7. In addition, as storage elements, they have a 1-bit register 8, an address register 9, as well as a module storage device 10. The modules 2 generally have similar structures, but for clarity, FIG. 1 depicts only one of the modules 2 in detail.

During normal operation of the automation system, the module controller 7 accesses the module storage device 10. In some instances, it may also access sensors and/or final controlling elements directly, as indicated by an arrow A in FIG 1.

One way in which a module 2 may perform its functions defectively is by responding when it has not, in fact, been addressed. That is, one module 2 may respond when actually another module 2 has been accessed. To ascertain such instances of faulty multiple responses to addressing by the modules, the following method may be performed when the automation system is initially put into operation.

Figure 2:
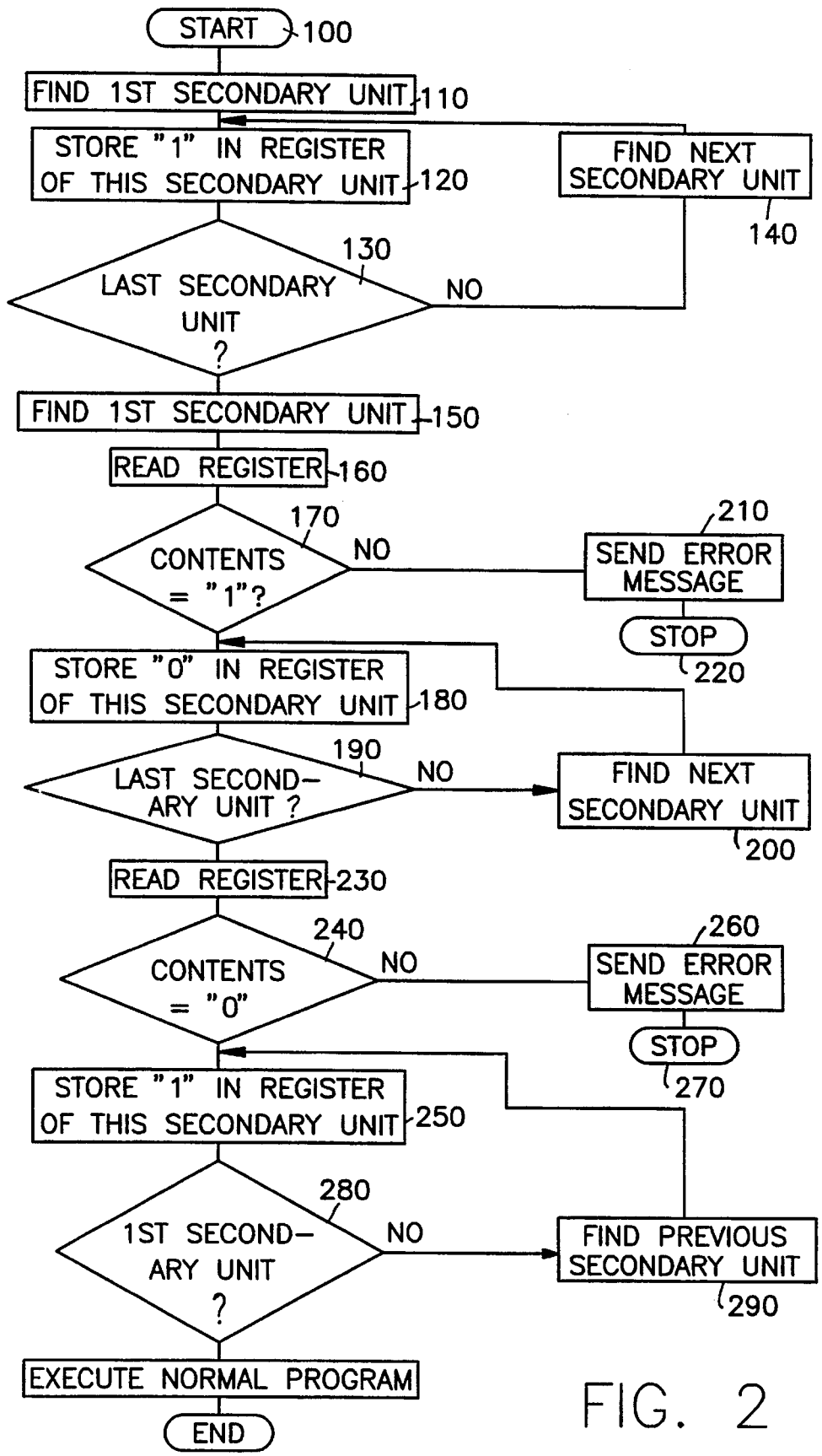
FIG. 2 shows a flowchart according to an embodiment of the method of the present invention which may be used to check that only one of the secondary units responds to a particular address.

As shown in the flowchart of FIG. 2, central processing unit 1 begins (100) by locating the modules (110) and storing a first identifier in the 1-bit register 8 of all modules 2. This first identifier is identical for all modules 2, and may be, e.g., a logical one (120)–(140). The central processing unit 1 then (150) reads the register 8 out of the module 2 having the lowest address (160) and checks whether the read value conforms with the first identifier (170). That is, whether it is a logical one. A different identifier, also called a second identifier, thus in the present case a logical zero, is then written into the register 8 (180) that was previously read out.

This procedure is repeated for all modules 2 (190)–(200). The sequence in which the modules 2 are addressed is thus determined in accordance with the addresses of the modules 2. As implied above, after the above method is carried out for a specific module 2, the next module to be addressed is the module 2 having the next higher address.

If during this read sequence the read-out value of a subsequently addressed module 2 deviates from the first identifier, in the above example this would imply a read-out value of logical zero, this indicates that an addressing error has occurred (210)–(220). More particularly, the module 2 having the incorrect identifier must already have been mistakenly addressed when one of the modules having a lower address was accessed such that the second identifier was stored in the register 8 of this faulty module 2 at the same time the content of register 8 was altered in the module having the lower address. In other words, the faulty module must have been addressed non-sequentially, had its identifier changed to, e.g., a logical zero, and this was identified when it is re-addressed in its typical sequential manner.

In the above-described method, defective modules 2 are only detected when they improperly respond to addresses which are lower than their actual address. To also be able to detect faulty modules 2 that respond to addresses that are higher than their actual address, the contents of the registers 8 are read out (230) once more, this time in a descending order of addresses (250)–(280)–(290). The check begins this time with that module 2 having the highest module-specific address. The actual identifier is read out of the register 8 once more and compared to the second identifier (240). A third identifier, that differs from the second identifier, thus in this case a logical one, is written into this register 8 (250). An addressing error is again detected as soon as a read-out identifier from a module deviates from the second identifier (260)–(270).

To enhance the reliability of the method still further, the modules may be sequentially addressed a second time, the first and second identifier being exchanged this time, however. Thus, a logical zero is initially written into the registers 8 during the second run-through. This logical zero is then checked and changed to a logical one, and changed back to logical zero during the return sequence.

To enable the detection of module errors, the above method may not only be applied during the initial operation of an electrical unit, but also from time to time during its continuous operation that is, it may run after execution of the normal program (300). For example, the modules could be checked every minute.

Thus, it can easily be determined if more than one module 2 responds to a specific address due to a hardware error. If no error of the type described above is discovered, then it is guaranteed that only one of the modules 2 responds to a particular module address. The system can also check that errors are not occurring during continuous operation via periodic, e.g., every minute, re-checks. However, the operation described above does not itself guarantee that the correct module is also the one that is responding to an addressing.

Figure 3:
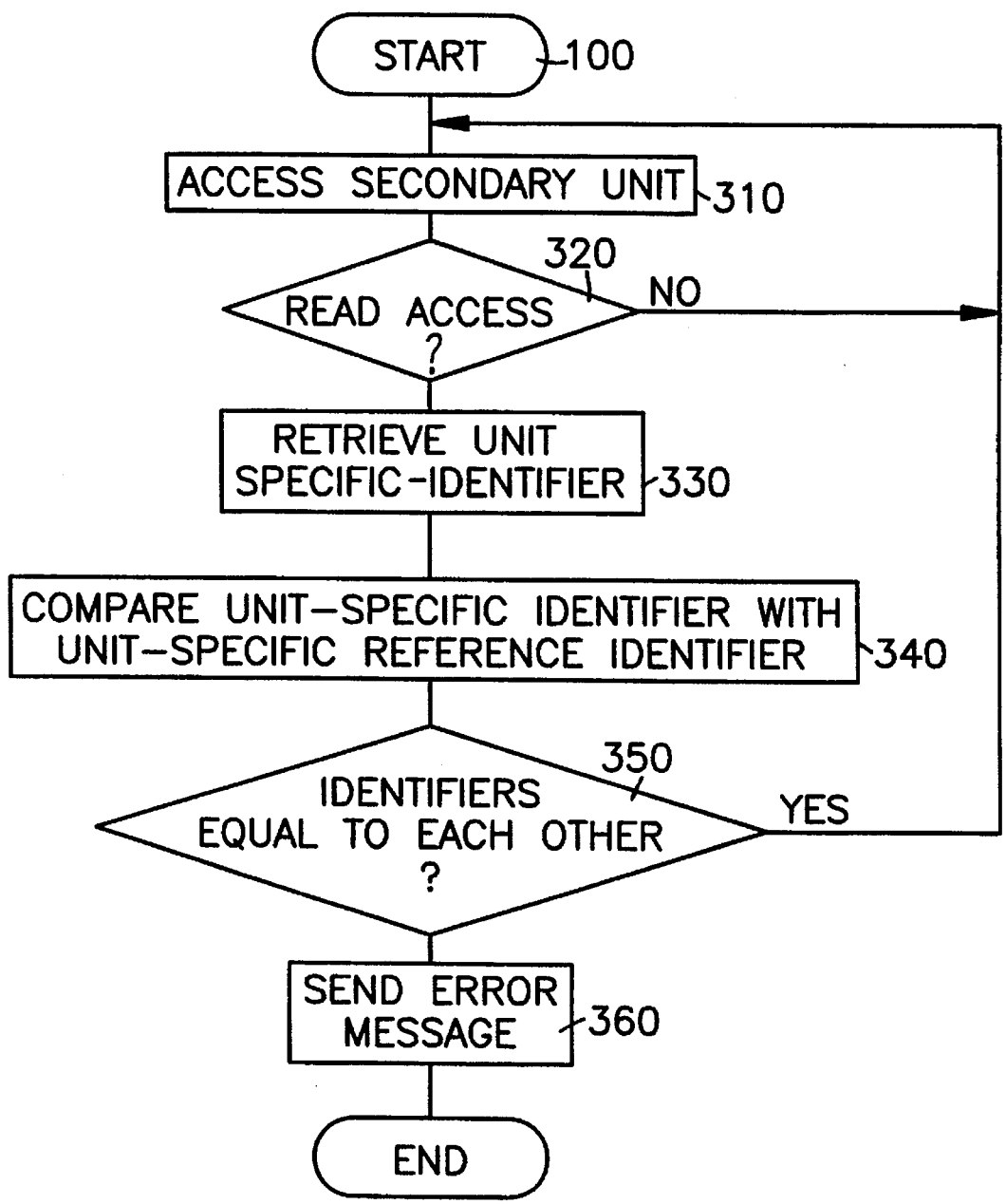
FIG. 3 shows a flowchart according to an embodiment of the method of the present invention which may be used to check that indeed the correct secondary unit is the one that is responding to a particular addressing.

The method of the present invention enables this check, as well as shown in the flowchart of FIG. 3. After the system has checked for multiple addressing, a module-specific identifier is written into the address registers 9 of the modules 2. The module-specific identifier is not written via the bus 3, but rather in a separate way (310). For example, the module-specific identifier may be adjusted via switches (not shown) arranged on the module 2 or it may be written into the modules 2 via a communication path that is separate from the bus 3.

These addresses remain stored in the registers 9 as long as they are not overwritten. Typically, the module-specific identifier corresponds to the module-specific address, e.g., it is identical to the physical address of its corresponding module 2. The modules 2 are often addressed via their geographic addresses which are determined by their slots. When reading attempts (320) are made by the central processing unit 1 to the module (330) 2, the physical address of this module is transmitted along with the requested data from the module. Therefore, an addressing error (360) may be detected when the physical address being transmitted to the central processing unit 1 no longer conforms (350) with the address the central processing unit expects to receive, denoted the module-specific reference identifier (340).

To increase the reliability of recognition, one can store not only the address, but also the inverse of the address in the register 9, and then transmit both when reading accesses are made by the central processing unit 1.

The invention described above may be used quite advantageously for redundant, e.g., for fault-tolerant and safety-oriented automation systems. This may be particularly important because errors in fault-tolerant automation systems can cause considerable damage. In the case of safety-oriented automation systems, errors may even lead to personal injuries.

What is claimed is:

1. A method for detecting addressing errors in an electrical unit, including a central processing unit and a plurality of secondary units comprising the steps of:

(a) storing a first identifier in a register in each of said plurality of secondary units, the first identifier being stored by the central processing unit;

(b) with a first sequence, reading a reference identifier from the register of each of the plurality of secondary units and storing a second identifier in the register of each of the plurality of secondary units, the reference identifier being read by the central processing unit and the second identifier being different from the first identifier; and (c) generating an error signal from the central processing unit when the first identifier is different from the reference identifier.

2. A method for detecting addressing errors in an electrical unit, including a central processing unit and a plurality of secondary units comprising the steps of:

(a) storing a first identifier in a register in each of said plurality of secondary units, the first identifier being stored by the central processing unit;

(b) with a first sequence, reading a reference identifier from the register of each of the plurality of secondary units and storing a second identifier in said register of each of the plurality of secondary units, the reference identifier being read by the central processing unit and the second identifier being different from the first identifier;

(c) generating an error signal from the central processing unit when the first identifier is different from the reference identifier;

(d) with a second sequence, reading a further reference identifier from the register of each of said plurality of secondary units and storing a third identifier in each of the plurality of secondary units, the further reference identifier being read by the central processing unit and the third identifier being stored by the central processing unit, wherein the third identifier is different from the second identifier and the first sequence is different from the second sequence; and (e) generating an error message when the further reference identifier differs from the second identifier.

3. The method of claim 1, wherein said first identifier is the same for all secondary units.

4. The method of claim 1, wherein said second identifier is the same for all secondary units.

5. The method of claim 2, wherein said third identifier is the same for each of the plurality of secondary units.

6. The method of claim 2, wherein said first identifier is the same as said third identifier.

* * * * *